C. CAMPEAUX.
Improvement in Water Meters.
No. 120,853.  Patented Nov. 14, 1871.
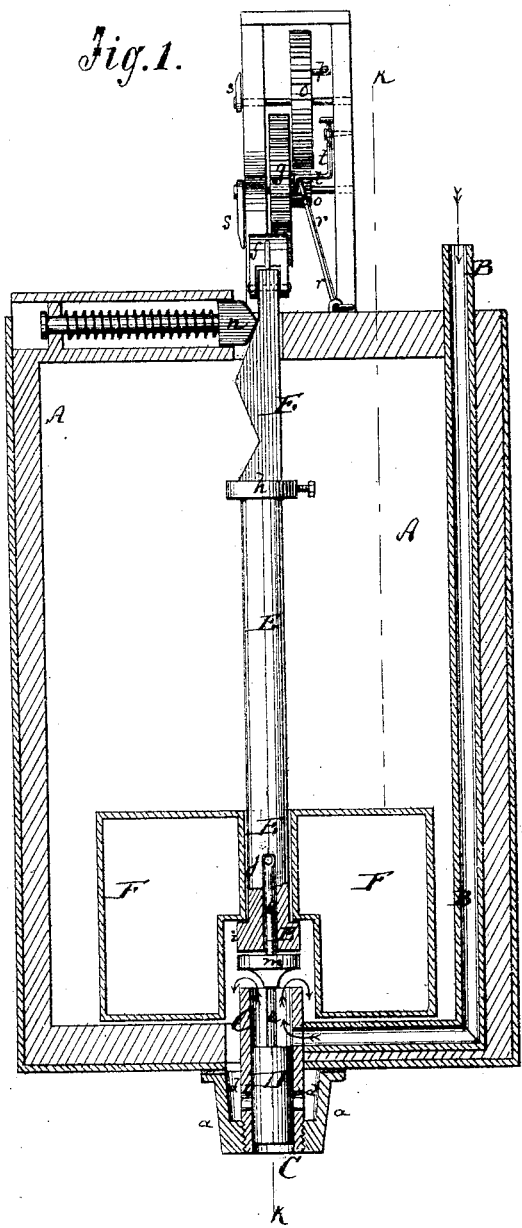
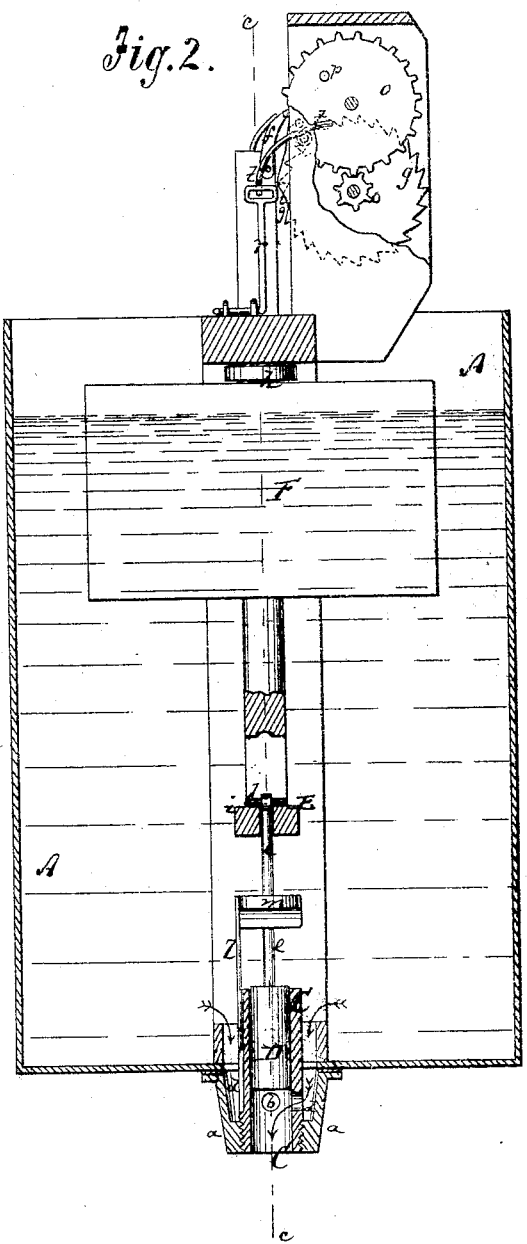
Witnesses:
A Bennewendorf
Francis McArdle
Inventor:
C Campeaux
PER
Attorneys.

UNITED STATES PATENT OFFICE.

CAMILLE CAMPEAUX, OF NEW YORK, N. Y.

IMPROVEMENT IN WATER-METERS.

Specification forming part of Letters Patent No. 120,853, dated November 14, 1871.

*To all whom it may concern:*

Be it known that I, CAMILLE CAMPEAUX, of the city of New York, in the county and State of New York, have invented a new and Improved Water-Meter; and I do hereby declare that the following is a full, clear, and exact description thereof, which will enable others skilled in the art to make and use the same, reference being had to the accompanying drawing forming part of this specification.

Figure 1 represents a vertical section of my improved water-meter, the line $c$ $c$, Fig. 2, indicating the plane of section. Fig. 2 is a vertical section of the same taken on the plane of the line $k$ $k$, Fig. 1.

Similar letters of reference indicate corresponding parts.

This invention relates to a new instrument for measuring the quantity of water or other fluid passing through it and recording the measurement thus taken. The invention consists in a new arrangement of parts, whereby a float is caused to alternately open and shut a valve and impart intermittent rotation to a recording-gear, all as hereinafter more fully described.

A in the drawing represents a box or hollow case of suitable form and size. B is the pipe conveying the water or other fluid to a short vertical pipe, C, which is fitted through the bottom of box A and open at both ends. The pipe B enters the upper part of C, as shown in Fig. 1. The lower part of C under the bottom of box A is perforated, as at $b$ $b$, the apertures leading to a surrounding annular space, $d$, whose upper end is open to the box, while its lower end is closed tight by a tubular nut, $a$, screwed upon the lower part of C. D is a plug, fitting tight in the pipe C, wherein it can play up and down to either close the apertures $b$ or the pipe B. The stem $e$ of the plug enters the lower end of the vertical rod or post E, which extends upward through the top of the box A. F is a float placed within the box A, and surrounding the post E. The upper end of the post carries a pawl, $f$, which, during every upward motion of E, strikes a toothed wheel, $g$, and imparts a partial turn to it. When the box is empty the plug D is lowered so as to close the apertures $b$, as shown in Fig. 1. The water entering C through the pipe B cannot escape from the box, but commences filling the same, thereby elevating the float. When the float is raised far enough to strike a shoulder, $h$, of the post E, said shoulder being adjustable on the post for regulating the exact amount of water to be measured, the post will be gradually raised with the float, and thereby act on the wheel $g$, as stated. Near the end of the upward motion the post will suddenly lift the plug D so as to close the pipe B and open the holes $b$ $b$, as in Fig. 2. Water will now escape through the space $d$ and holes $b$ into the lower part of pipe C, and thence to suitable receptacles. The float will gradually descend, and when quite down bear upon a shoulder, $i$, of the post, drawing it down and causing the plug to descend to reopen the pipe B and close the holes $b$. The measuring of water will then be resumed, as before stated. The post E during its upward motion does not at once take up the plug D, because the stem $e$ of the latter, with a projecting head or pin, $j$, enters a slotted part of the post, which gives the same some independent upward movement, and thereby provides for the sudden rising of the plug at the right time. A spring, $l$, projecting from a shoulder, $m$, of the stem $e$ and bearing against the outer side of the tube C, serves to retain the plug in its desired positions. During the descent of the post, caused by the dead weight of the float, the plug will also remain unaffected until at the very end of such descent, when it is also lowered, as before stated. $n$ is a spring-slide, bearing against the notched upper part of the post E for retaining it in its two positions, so that the mere friction of the float will not cause its displacement. The gear-wheel $g$ is connected with other toothed wheels $o$ $o$, of which one has a projecting pin, $p$. This pin, when it reaches contact with a pivoted lever, $t$, serves to release a drop, $r$, held away from the post E by said lever, as in Fig. 1.

If it is desired to permit the use of a certain quantity of water to the party holding the meter, the pin $p$ is set so that when the specified number of measures have been drawn the drop $r$ will be caused to swing against the post E and under the pawl $f$; thereby the drop will prevent the further descent of the post, and keep the plug raised and the pipe B closed. A locked meter will thus permit full control of discharge. The gear-wheels are furthermore connected with suitable pointers $s$ $s$, which move over proper dials to indicate the number of strokes of the post and the consequent number of measure drawn.

Having thus described my invention, I claim as new and desire to secure by Letters Patent—

1. The elastic friction slide $l$, connected with the stem $e$ of the plug D and bearing against the tube C in order to retain the plug in its respective positions, substantially as herein shown and described.

2. The pin $p$ on the wheel $o$, combined with the lever $t$ and drop $r$ for locking the post E and plug D, in the elevated position, substantially as herein shown and described.

CAMILLE CAMPEAUX.

Witnesses:
 GEORGE W. MABEE,
 T. B. MOSHER.  (167)